US009239944B2

(12) United States Patent
Abe

(10) Patent No.: US 9,239,944 B2
(45) Date of Patent: Jan. 19, 2016

(54) BIOMETRIC INFORMATION REGISTRATION DEVICE AND BIOMETRIC INFORMATION REGISTRATION METHOD

(71) Applicant: FUJITSU LIMITED, Kawasaki-shi, Kanagawa (JP)

(72) Inventor: Narishige Abe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 405 days.

(21) Appl. No.: 13/922,958

(22) Filed: Jun. 20, 2013

(65) Prior Publication Data

US 2013/0279770 A1    Oct. 24, 2013

Related U.S. Application Data

(63) Continuation of application No. PCT/JP2010/073831, filed on Dec. 29, 2010.

(51) Int. Cl.
*G06K 9/00* (2006.01)
*G06K 9/03* (2006.01)

(52) U.S. Cl.
CPC .......... *G06K 9/00087* (2013.01); *G06K 9/0008* (2013.01); *G06K 9/00026* (2013.01); *G06K 9/036* (2013.01)

(58) Field of Classification Search
CPC .......... G06K 9/00006; G06K 9/00013; G06K 9/00067; G06K 9/0008; G06K 9/00087; G06K 9/001
See application file for complete search history.

(56) References Cited

U.S. PATENT DOCUMENTS

| 5,659,626 | A | * | 8/1997 | Ort | ...................... G06K 9/00067 382/125 |
| 6,526,396 | B1 | * | 2/2003 | Hiratsuka | .......... G06K 9/00087 382/115 |
| 6,567,765 | B1 | * | 5/2003 | Wu | ........................ G06K 9/036 702/108 |
| 2005/0100200 | A1 | | 5/2005 | Abiko et al. | |
| 2006/0117188 | A1 | | 6/2006 | Fiske et al. | |

(Continued)

FOREIGN PATENT DOCUMENTS

| EP | 2128817 A1 | 12/2009 |
| EP | 2141633 A2 | 1/2010 |

(Continued)

OTHER PUBLICATIONS

Chen et al., "Fingerprint Quality Indices for Predicting Authentication Performance", Jul. 22, 2005, Springer, Proc. 5th Int. Conf. on Audio- and Video-Based Biometric Person Authentication, LNCS vol. 3564, p. 160-170.*

(Continued)

*Primary Examiner* — Nirav G Patel
*Assistant Examiner* — Timothy Choi
(74) *Attorney, Agent, or Firm* — Staas & Halsey LLP

(57) ABSTRACT

The quality of biometric information that will be input the next time is estimated. Estimated matching quality information is calculated which indicates the degree of matching between estimated quality information and quality information of the actually input biometric information. Further, past quality information is calculated which indicates how the quality of a plurality of pieces of estimated matching quality information varied in the past. Then, whether or not the biometric information is to be registered is determined according to the estimated matching quality information and the past quality information.

10 Claims, 17 Drawing Sheets

(56) References Cited

U.S. PATENT DOCUMENTS

| | | | |
|---|---|---|---|
| 2008/0212846 A1* | 9/2008 | Yamamoto | G06K 9/68 382/115 |
| 2008/0260209 A1 | 10/2008 | Yabushita | |
| 2009/0154779 A1 | 6/2009 | Satyan et al. | |
| 2009/0279742 A1 | 11/2009 | Abiko | |
| 2012/0014570 A1 | 1/2012 | Abe | |

FOREIGN PATENT DOCUMENTS

| | | |
|---|---|---|
| EP | 2166475 A1 | 3/2010 |
| JP | 2000-57341 | 2/2000 |
| JP | 2002-236665 | 8/2002 |
| JP | 2004-178057 | 6/2004 |
| JP | 2004-348726 | 12/2004 |
| JP | 2007-4823 | 1/2007 |
| JP | 2008-226067 | 9/2008 |
| JP | 2009-64261 | 3/2009 |
| WO | 2008/090608 A1 | 7/2008 |
| WO | 2010/119500 A1 | 10/2010 |

OTHER PUBLICATIONS

Fronthaler et al., "Fingerprint Image-Quality Estimation and its Application to Multialgorithm Verification", Jun. 2008, IEEE Transactions on Information Forensics and Security, vol. 3, No. 2, p. 331-338.*

Tabassi et al., "A Novel Approach to Fingerprint Image Quality", Sep. 14, 2005, IEEE Int. Conf. on Image Processing 2005, vol. 2, p. 37-44.*

Grother et al., "Performance of Biometric Quality Measures", Apr. 2007, IEEE Transactions on Pattern Analysis and Machine Intelligence, vol. 29, No. 4, p. 531-543.*

Extended European Search Report dated Apr. 22, 2014 in corresponding European Patent Application No. 10861509.7.

PCT International Preliminary Report on Patentability issued Jul. 10, 2013 in corresponding International Application No. PCT/JP2010/073831.

International Search Report mailed on Feb. 8, 2011 for corresponding International Application No. PCT/JP2010/073831.

* cited by examiner

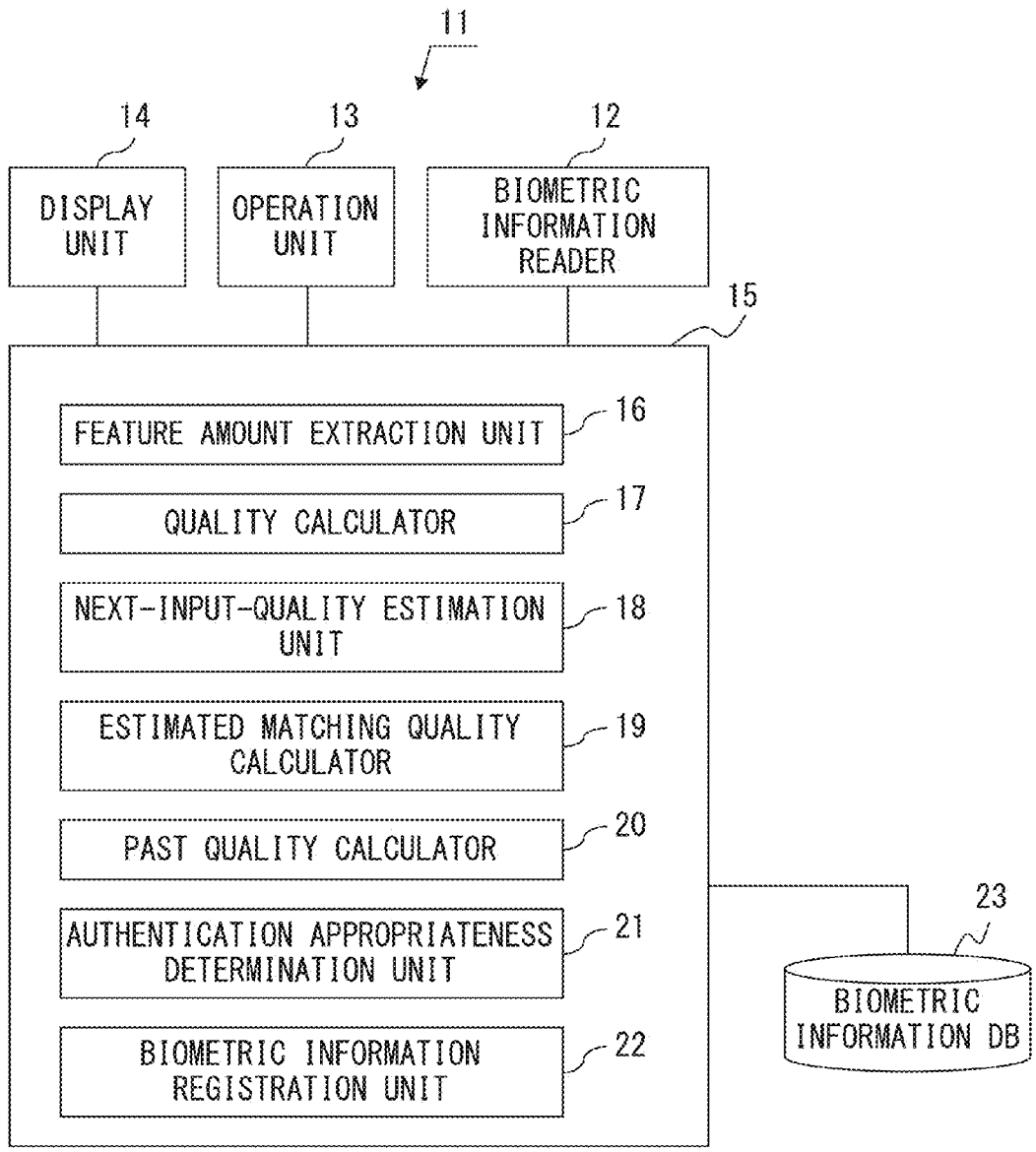
F I G. 1

| ID |
|---|
| BIOMETRIC INFORMATION 1 |
| BIOMETRIC INFORMATION 2 |
| ⋮ |

F I G. 3 A

| FIRST-INPUT QUALITY VALUE |
|---|
| SECOND-INPUT QUALITY VALUE |
| THIRD-INPUT QUALITY VALUE |
| ⋮ |

F I G. 3 B

| SECOND-INPUT ESTIMATED MATCHING QUALITY VALUE |
|---|
| THIRD-INPUT ESTIMATED MATCHING QUALITY VALUE |
| FOURTH-INPUT ESTIMATED MATCHING QUALITY VALUE |
| ⋮ |

F I G. 3 C

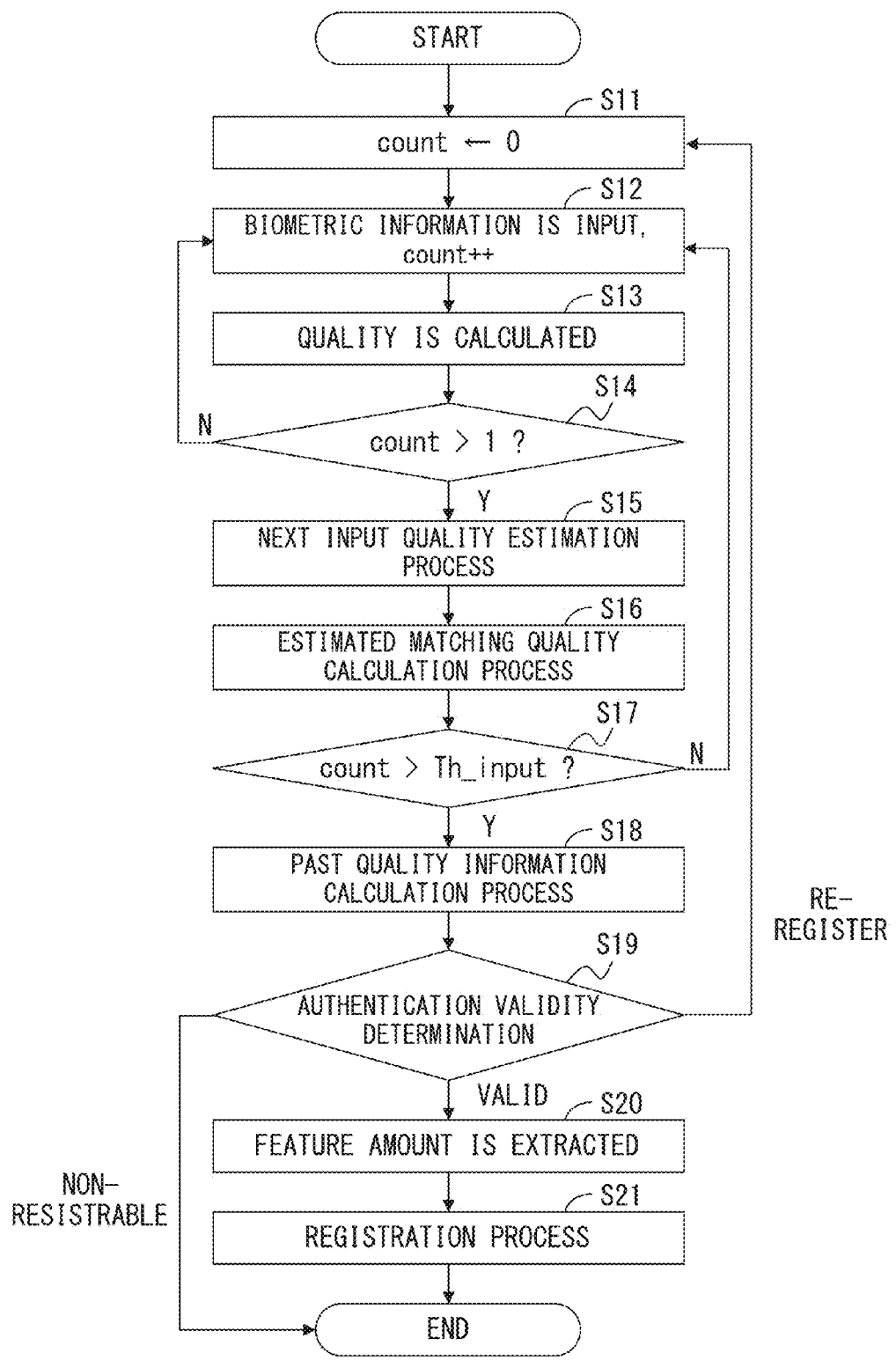
F I G. 4

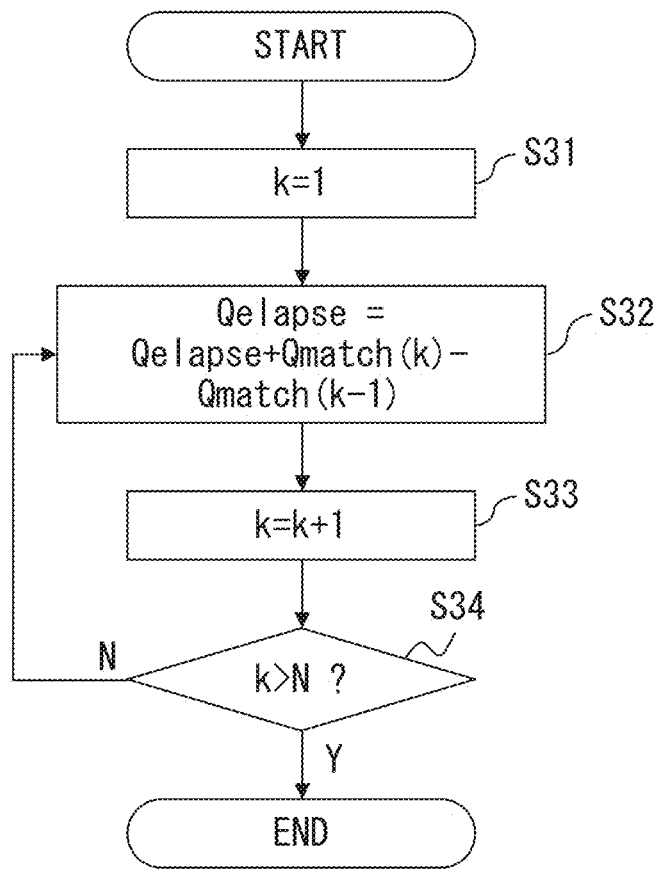
F I G. 5

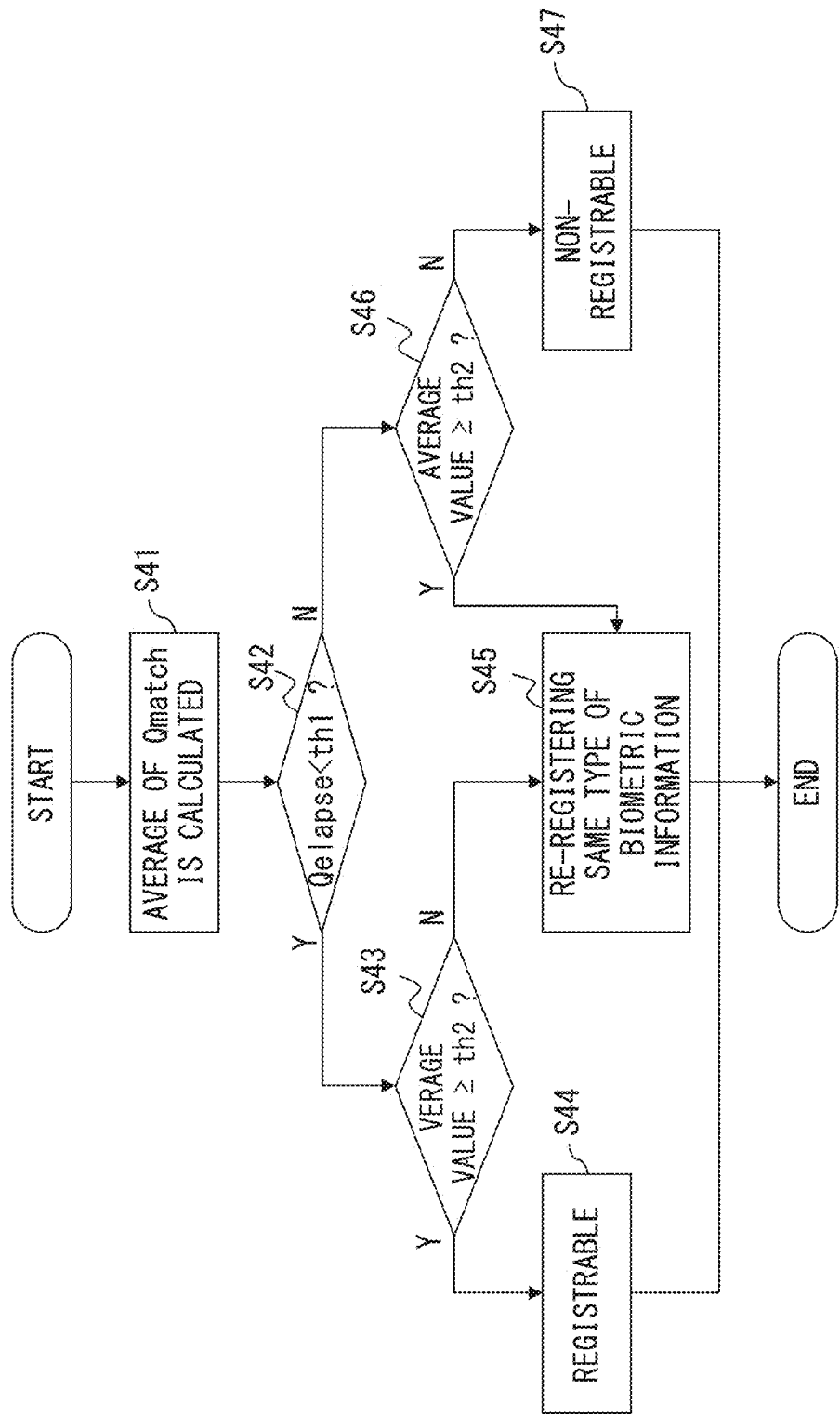
F I G. 6

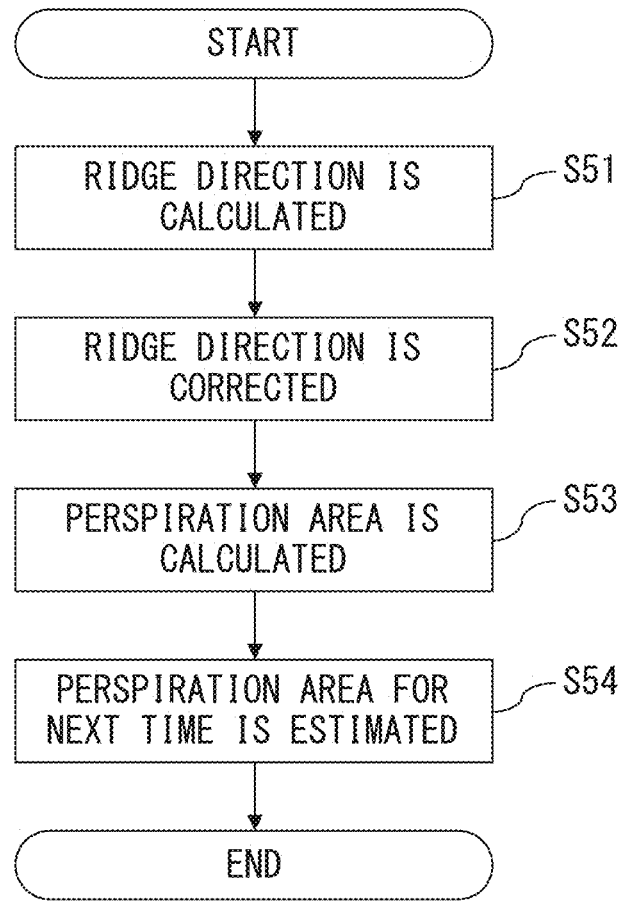
F I G. 7

| 0 | 0 | 0 | · · · | 1 | · · · | 0 |

FIG. 13

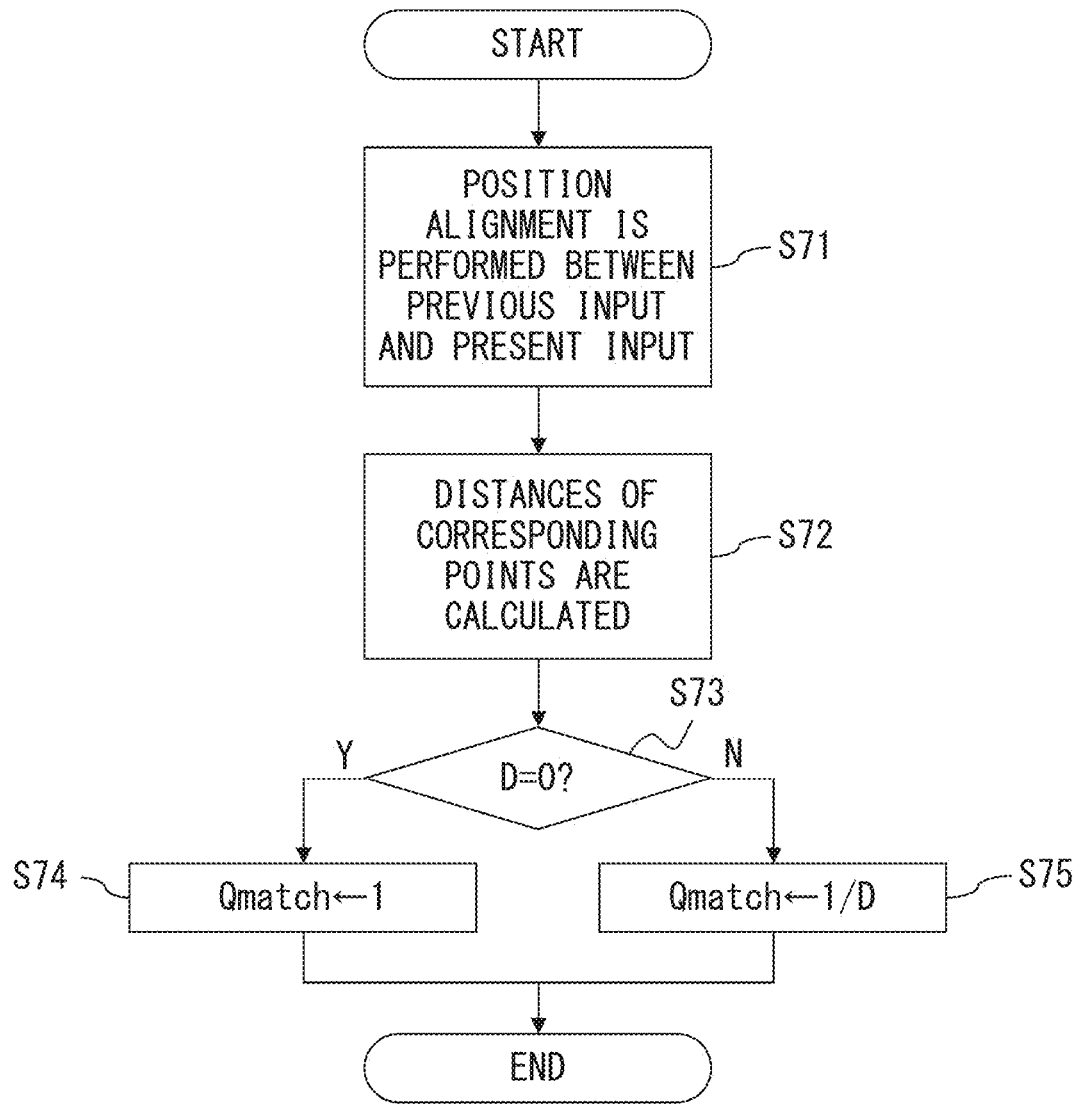
F I G. 14

BIOMETRIC INFORMATION REGISTRATION DEVICE AND BIOMETRIC INFORMATION REGISTRATION METHOD

CROSS-REFERENCE TO RELATED APPLICATION

This application is a continuation of PCT application PCT/JP2010/073831 which was filed on Dec. 29, 2010, the entire contents of which are incorporated herein by reference.

FIELD

The embodiments discussed herein are related to a device that registers biometric information such as fingerprints and blood vessels.

BACKGROUND

For the purpose of retaining security, the use of biometric information has become widespread for the authentication of people who enter a facility. Some personal devices such as personal computers and mobile phones are provided with biometric authentication functions such that the unauthorized use by other people will be prevented.

Biometric information is registered in advance in order to perform biometric authentication. However, users are not necessarily familiar with the registration process of biometric information, and some users may register biometric information of low quality. In such cases, a registrant may fail to be authorized in actual operation even though he/she is a genuine registrant. Moreover, an authentication error may occur due to the environment in which the biometric information is to be input being different from the environment at the time of the registration.

As a solution to the above problem, a technique is known in which registration threshold setting means capable of setting registration fingerprint quality is provided and the registration of fingerprint data below a certain level of quality is not allowed at the time of fingerprint registration. Furthermore, a technique is known in which the registered fingerprint data and the most recent successfully verified fingerprint data are stored and the influence due to the environment in which the biometric information is input is minimized by performing comprehensive evaluation for the fingerprint data to be verified, the registered fingerprint data, and the most recent successfully verified fingerprint data (for example, see Patent Document 1).

A technique is known in which the environment of when the biometric information was input is stored in association with the biometric information so as to reduce the variation in accuracy due to changes in the environment where the biometric information is input or deterioration over time, and authentication is performed by referring to the environment where the registered biometric information was input at the time of verification (for example, see Patent Document 2).

A technique is known in which partial images of a fingerprint are read by a fingerprint sensor and a fingerprint image is acquired from the read partial images for the purpose of minimizing a chip area in a fingerprint sensor where a semiconductor chip is used (for example, see Patent Document 3).

DOCUMENTS OF PRIOR ART

Patent Documents

Patent Document 1: Japanese Laid-open Patent Publication No. 2000-057341

Patent Document 2: Japanese Laid-open Patent Publication No. 2002-236665

Patent Document 3: Japanese Laid-open Patent Publication No. 2004-348726

SUMMARY

The biometric information registration device disclosed herein includes: a biometric information reading unit configured to read biometric information; a quality calculation unit configured to calculate quality information of the biometric information which is read by the biometric information reading unit; a quality estimation unit configured to estimate quality of biometric information that will be input a next time, according to the quality information calculated by the quality calculation unit; an estimated matching quality calculation unit configured to calculate estimated matching quality information which indicates a degree of matching between estimated quality information estimated by the quality estimation unit and quality information of next biometric information calculated by the quality calculation unit; a past quality calculation unit configured to calculate past quality information which indicates how the quality of a plurality of pieces of estimated matching quality information varied in the past; an authentication appropriateness determination unit configured to determine whether or not the biometric information is to be registered according to the estimated matching quality information and the past quality information; and a biometric information registration unit configured to register the biometric information when the authentication appropriateness determination unit determines that the biometric information is to be registered.

The object and advantages of the invention will be realized and attained by means of the elements and combinations particularly pointed out in the claims.

It is to be understood that both the forgoing general description and the following detailed description are exemplary and explanatory and are not restrictive of the invention.

BRIEF DESCRIPTION OF DRAWINGS

FIG. 1 illustrates a biometric information registration device according to an embodiment.

FIGS. 3A-3C illustrate the data structure.

FIG. 4 is a flowchart of the processes in which biometric information is registered, according to an embodiment.

FIG. 5 is a flowchart of a past quality calculation process.

FIG. 6 is a flowchart of an authentication validity determination process.

FIG. 7 is a flowchart of a perspiration area estimation process according to the first embodiment.

FIG. 13 illustrates the data structure of a resistance area.

FIG. 14 is a flowchart of an estimated matching quality calculation process according to the second embodiment.

DESCRIPTION OF EMBODIMENTS

Figure 2:
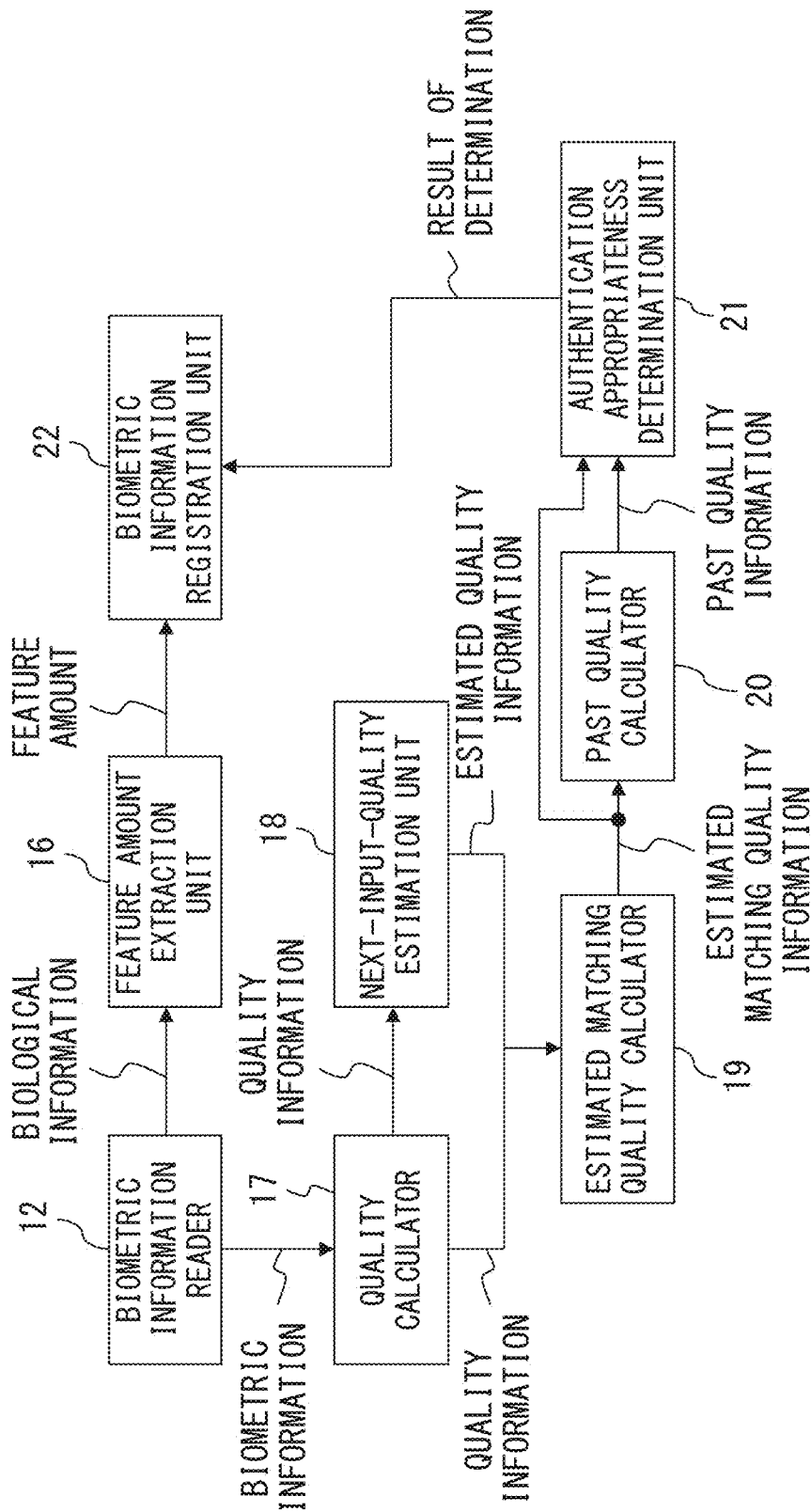
FIG. 2 illustrates input and output information of each element.

Some embodiments will be described below. FIG. 1 illustrates the configuration of a biometric information registration device 11 according to the first embodiment. The biometric information registration device 11 is a device for registering biometric information of, for example, a fingerprint, a palm print, and the distribution of blood vessels. A biometric information registration device may be configured only to register biometric information, or may be configured to both register and authenticate biometric information. A biometric information registration device according to an embodiment described below is used, for example, to authenticate a user of a personal computer.

The biometric information registration device 11 includes a biometric information reader 12, an operation unit 13, a display unit 14, and a controller 15. The controller 15 includes a feature amount extraction unit 16, a quality calculator 17, a next-input-quality estimation unit 18, an estimated matching quality calculator 19, a past quality calculator 20, an authentication appropriateness determination unit 21, and a biometric information registration unit 22. Furthermore, a biometric information database 23 in which registered biometric information is stored is also included.

The biometric information reader 12 outputs the image data of a site of a living body (for example, a finger and a palm). The biometric information reader 12 is, for example, a fingerprint sensor. In the present embodiment, the reading area of a fingerprint sensor is narrower than the entire area of a fingerprint, and the whole fingerprint is read by letting a finger move on the fingerprint sensor. Accordingly, it becomes possible to reduce the size of a fingerprint sensor and to reduce the cost for parts.

The feature amount extraction unit 16 extracts the amount of a feature that exists from the biometric information read by the biometric information reader 12. In the case of fingerprints, for example, a branch point of a fingerprint where a ridge branches off or an end point of a fingerprint where a ridge comes to an end is extracted as the amount of a feature that exists. A known method may be used for extracting the amount of a feature that exists from biometric information.

The quality calculator 17 calculates the quality of biometric information from the input biometric information. The quality information calculated by the quality calculator 17 includes, for example, the dimensions of an area where the distinction between a ridge and valley line of a fingerprint is unclear, the moving velocity at which a finger is slid to input the fingerprint, or the dimensions of the read fingerprint.

The next-input-quality estimation unit 18 uses estimation models where the characteristic variation caused when a fingerprint is input is taken into consideration, and it estimates the quality of biometric information that will be input the next time. The information obtained by the above estimation is the estimated quality information.

In the embodiments described below, for example, a perspiration area of a fingerprint, a resistance area of a fingerprint, or a read starting point of a fingerprint are estimated as the next input quality.

The estimated matching quality calculator 19 calculates the degree of matching between the estimated quality information estimated by the next-input-quality estimation unit 18 and the quality information of the actually input biometric information as estimated matching quality information.

The past quality calculator 20 calculates the past quality of a plurality of pieces of estimated matching quality information as past quality information. The past quality calculator 20 calculates, for example, the accumulated value of the differences in the estimated matching quality information in chronological order as the past quality information. When the accumulated value of the differences in chronological order is calculated as the past quality information, a value of the past quality information becomes smaller as the differences in the estimated matching quality information become smaller.

The authentication appropriateness determination unit 21 compares the past quality information calculated by the past quality calculator 20 with the first threshold, and compares the estimated matching quality information calculated by the estimated matching quality calculator 19 with the second threshold. Then, the authentication appropriateness determination unit 21 determines whether or not the biometric information is to be registered according to the results of the above comparing processes.

The authentication appropriateness determination unit 21, for example, determines whether or not the biometric information is to be registered by using "Equation 1" below.

if $Q_{elapse} <$ th1 ave($Q_{match}$)≥th2 Registrable ave($Q_{match}$)<th2 Re-register the same type of biometric information else ave($Q_{match}$)≥th2 Re-register the same type of biometric information ave($Q_{match}$)<th2 Re-register another type of biometric information (Equation 1)

In the above Equation, $Q_{match}$ indicates the degree of matching between the estimated quality information and the quality information of the actually input biometric information. The higher the degree of matching between the estimated quality information and the quality information of the actually input biometric information, the greater the value of $Q_{match}$. The lower the degree of matching, the smaller the value of $Q_{match}$.

$Q_{elapse}$ indicates the change in the estimated matching quality information, and the smaller the variation in the estimated matching quality information, the smaller the value of $Q_{elapse}$. For example, when a fingerprint is read two or more times at the time of registration, the accumulated value of the differences in the column of the estimated matching quality information in chronological order is calculated as past quality information $Q_{elapse}$.

th1 indicates the first threshold, which is the upper limit of past quality information $Q_{elapse}$, and th2 indicates the second threshold, which is the lower limit of estimated matching quality information $Q_{match}$.

The authentication appropriateness determination unit 21 determines whether or not the past quality information $Q_{elapse}$ is less than the first threshold th1, and determines whether or not the value obtained from pieces of estimated matching quality information (for example, an average value) is equal to or greater than the second threshold th2. When the past quality information $Q_{elapse}$ is less than the first threshold th1 and the average value ave($Q_{match}$) of the estimated matching quality information $Q_{match}$ is equal to or greater than the second threshold th2, it is determined that the input biometric information is to be registered.

When the past quality information $Q_{elapse}$ is less than the first threshold th1 and the average value ave($Q_{match}$) of the estimated matching quality information $Q_{match}$ is less than the second threshold th2, it is determined that the input biometric information is not to be registered. In this case, a user is encouraged to register the same type of biometric information again. For example, the authentication appropriateness determination unit 21 displays a message that encourages the re-registration of the biometric information on a display unit, or outputs the message by voice.

On the other hand, when the past quality information $Q_{elapse}$ is equal to or greater than the first threshold th1 and the average value ave($Q_{match}$) of the estimated matching quality information $Q_{match}$ is equal to or greater than the second threshold th2, the authentication appropriateness determination unit 21 determines that the input biometric information is not to be registered and provides instructions to re-register the same type of biometric information.

When the past quality information $Q_{elapse}$ is equal to or greater than the first threshold th1 and the average value ave($Q_{match}$) of the estimated matching quality information $Q_{match}$ is less than the second threshold th2, it is determined that the input biometric information is not to be registered and instructions are provided to register a different type of biometric information (for example, the information of another finger in the fingerprint authentication).

The determination of whether or not the biometric information is to be registered by the authentication appropriateness determination unit 21 is not limited to a method for calculating the sum of differences in the column of the estimated matching quality information in a time series. For example, the dispersion in the column of the estimated matching quality information may be calculated, and when the dispersion is equal to or less than a certain value, it is determined that that the input biometric information is to be registered. How whether or not the values are equal to or greater than the thresholds is determined is also not limited to the determination method described above. For example, when the value of $Q_{match}$ becomes smaller as the degree of matching becomes higher, whether or not the value of $Q_{match}$ is less than a threshold is determined.

The biometric information registration unit 22 registers the biometric information extracted by the feature amount extraction unit 16 according to the result of the determination by the authentication appropriateness determination unit 21.

The biometric information database 23 stores the biometric information that is instructed to be registered by the biometric information registration unit 22. The biometric information database 23 is not necessarily provided within the biometric information registration device 11, but may be provided for another device in such a manner that the biometric information database 23 is accessed by the biometric information registration device 11 through the network.

FIG. 2 illustrates the input and output information by elements of a biometric information registration device. The biometric information that is read by the biometric information reader 12 is output to the feature amount extraction unit 16 and the quality calculator 17. The quality information of biometric information calculated by the quality calculator 17 is output to the next-input-quality estimation unit 18 and the estimated matching quality calculator 19.

The next-input-quality estimation unit 18 estimates the next input quality by using the quality information of the input biometric information.

The estimated matching quality calculator 19 calculates estimated matching quality information by using the quality information output from the quality calculator 17 and the estimated quality information output from the next-input-quality estimation unit 18. The calculated estimated matching quality information is output to the past quality calculator 20 and the authentication appropriateness determination unit 21.

The past quality calculator 20 calculates past quality information by using the pieces of estimated matching quality information output from the estimated matching quality calculator 19, and outputs the calculated past quality information to the authentication appropriateness determination unit 21.

The authentication appropriateness determination unit 21 determines whether or not the biometric information is to be registered by using the estimated matching quality information output from the estimated matching quality calculator 19 and the past quality information output from the past quality calculator 20, and outputs the result of the determination to the biometric information registration unit 22.

When a result of a determination that the biometric information is to be registered is received from the authentication appropriateness determination unit 21, the biometric information registration unit 22 registers the data of the amount of a feature that exists in the biometric information output from the feature amount extraction unit 16 in the biometric information database 23. When a result of a determination that the biometric information is not to be registered is received, the biometric information registration unit 22 does not register the input data of the amount of a feature that exists.

FIG. 3A illustrates the data structure of the biometric information database 23. Several pieces of biometric information such as biometric information 1 and biometric information 2 are registered in the biometric information database 23 in association with the ID that specifies a registrant. In the present embodiment, a fingerprint of the same finger is input two or more times at the time of registration, and thus one or more pieces of biometric information are registered for one ID.

FIG. 3B illustrates the data structure of the quality information of biometric information. The quality value of the first-input biometric information (quality information) and the quality value of the second-input biometric information or the like are stored in a storage device such as a memory.

FIG. 3C illustrates the data structure of the estimated matching quality information. The estimated matching quality information that indicates the degree of matching between the estimated quality information obtained from the quality information of the first-input biometric information and the quality information of the second-input biometric information is stored in a storage device such as a memory as the estimated matching quality value that was input second. In a similar manner, the estimated matching quality information that indicates the degree of matching between the estimated quality information obtained from the quality information of the biometric information that was second- (or first- and second-) input and the quality information of the biometric information that was third-input is stored in a memory as the estimated matching quality value that was input third.

FIG. 4 is a flowchart of the processes in which biometric information is registered, according to an embodiment. The processes in FIG. 4 are executed, for example, by a CPU of the controller 15 or the like. An initial value "0" is set to the count of a counter that measures the number of times biometric information is input (S11).

When biometric information is read by the biometric information reader 12, the count value of the counter is incremented (S12).

Next, the quality of the biometric information read by the biometric information reader 12 is calculated (S13). In the process of step S13, for example, the dimensions or the like of an area in which the distinction between a ridge and valley line is unclear is calculated as quality information in the case of fingerprint authentication.

Next, whether or not the count value of the counter is greater than "1" is determined (S14). When the count value of the counter is equal to or smaller than "1" ("NO" in S14), the process returns to step S12 and the process in which biometric information is input is performed again.

On the other hand, when the count value of the counter is greater than "1" ("YES" in S14), the process shifts to step S15, and next input quality is estimated. In step S15, for example, the position of a perspiration area in which the distinction between a ridge and valley line is unclear is estimated.

Next, an estimated matching quality calculation process is performed (S16). In the estimated matching quality calculation process of step S16, the degree of matching between the next input quality information estimated in a next input quality estimation process (S15) and the quality information of the actually input biometric information is calculated as estimated matching quality information.

Next, whether or not the count value of the counter is greater than a threshold Th_input of the number of inputs is determined (S17). When the count value of the counter is equal to or smaller than the threshold Th_input ("NO" in S17), the process returns to step S12.

On the other hand, when the count value of the counter is greater than the threshold Th_input, i.e., when biometric information has been input a necessary number of times ("YES" in S17), a past quality information calculation process in step S18 is performed.

Next, an authentication validity determination process in step S19 is performed. In the authentication validity determination process of step S19, the past quality information and the estimated matching quality information are each compared with a threshold to determine whether the input biometric information is to be registered.

When it is determined that the input biometric information is not to be registered, the process returns to step S11, and a user is asked to input the same type of biometric information or a different type of biometric information again. Alternatively, it is determined that the registration is not possible and the process is terminated.

On the other hand, when it is determined that the biometric information is to be registered ("valid" in S19), the process shifts to step S20 and the amount of a feature that exists in biometric information is extracted.

Next, a registration process is executed (S21). In the registration process of step S21, for example, the data of the feature amount of the extracted biometric information is registered in the biometric information database 23 in association with the ID that specifies a registrant.

FIG. 5 is a flowchart of the processes in which past quality is calculated in step S18 of FIG. 4.

"1" is set to a counter k as the initial value (S31). Next, current past quality information $Q_{elapse}$ is calculated by adding a difference between the currently estimated matching quality information $Q_{match}(k)$ and the previously estimated matching quality information $Q_{match}(k-1)$ to the previous past quality information $Q_{elapse}$. In the process of step S32, the accumulated value of difference values in the estimated matching quality information $Q_{match}(k)$ is obtained in chronological order as the past quality information $Q_{elapse}$.

Next, the value of counter k is incremented (S33). Next, whether or not the value of counter k is greater than a specified upper limit N for the number of inputs is determined (S34). When the value of counter k is equal to or smaller than the upper limit N ("NO" in S34), the process returns to step S32, and next past quality information is calculated. When the value of counter k is greater than N ("YES" in S34), i.e., when the value of counter k exceeds an upper limit N for the number of inputs, the process moves forward.

FIG. 6 is a flowchart of an authentication validity determination process in step S19 of FIG. 4.

Firstly, an average value of the estimated matching quality information $Q_{match}$ is calculated (S41). Next, whether or not the past quality information $Q_{elapse}$ calculated in the past quality calculation process (S18) is less than a first threshold th1 is determined (S42).

When the past quality information $Q_{elapse}$ is less than the first threshold th1 ("YES" in S42), the process shifts to step S43, and whether or not the average value of the estimated matching quality information $Q_{match}$ is equal to or greater than a second threshold th2 is determined.

When the average value of the estimated matching quality information $Q_{match}$ is equal to or greater than the second threshold th2 ("YES" in S43), the process shifts to step S44, and it is determined that it is possible to register the input biometric information.

On the other hand, when the average value of the estimated matching quality information $Q_{match}$ is less than the second threshold th2, the process shifts to step S45, and a user is instructed to register the same type of biometric information again.

When it is determined in step S42 that the past quality information $Q_{elapse}$ is equal to or greater than the first threshold th1 ("NO" in S42), the process shifts to step S46, and whether or not the average value of the estimated matching quality information $Q_{match}$ is equal to or greater than the second threshold th2 is determined.

When the average value of the estimated matching quality information $Q_{match}$ is equal to or greater than the second threshold th2 ("YES" in S46), the process shifts to the above step S45, and a user is instructed to register the same type of biometric information again.

When the past quality information $Q_{elapse}$ is equal to or greater than first threshold th1 and the average value of the estimated matching quality information $Q_{match}$ is less than the second threshold th2 ("NO" in S46), the process shifts to step S47, and it is determined that it is not possible to register the input biometric information.

As an example of the next input quality estimation process in step S15 of FIG. 4, how processes are performed in cases where a perspiration area of a fingerprint is estimated, in cases where a resistance area of when a finger is slid is estimated, or in cases where an input starting point is estimated will be described in detail.

FIG. 7 is a flowchart of how processes are performed in the first embodiment to estimate a perspiration area as the next input quality estimation information.

The ridge direction of a fingerprint is calculated (S51) The ridge direction is obtained by calculating the ridge direction of a center pixel in each block of a fingerprint image with the size w*w. The data of the calculated ridge direction is stored in a storage device such as a memory.

Next, the ridge direction of a low-contrast area is corrected (S52). The correction of a ridge direction is achieved by a method in which a smoothed mask such as the Gaussian filter is used, a method in which the flow of a ridge direction is smoothed by performing modeling with the use of a phase diagram, or the like. The data of the corrected ridge direction is stored in a storage device such as a memory.

Next, a perspiration area of the input biometric information is calculated (S53). The data of the calculated perspiration area is stored in a storage device such as a memory.

Figure 8:
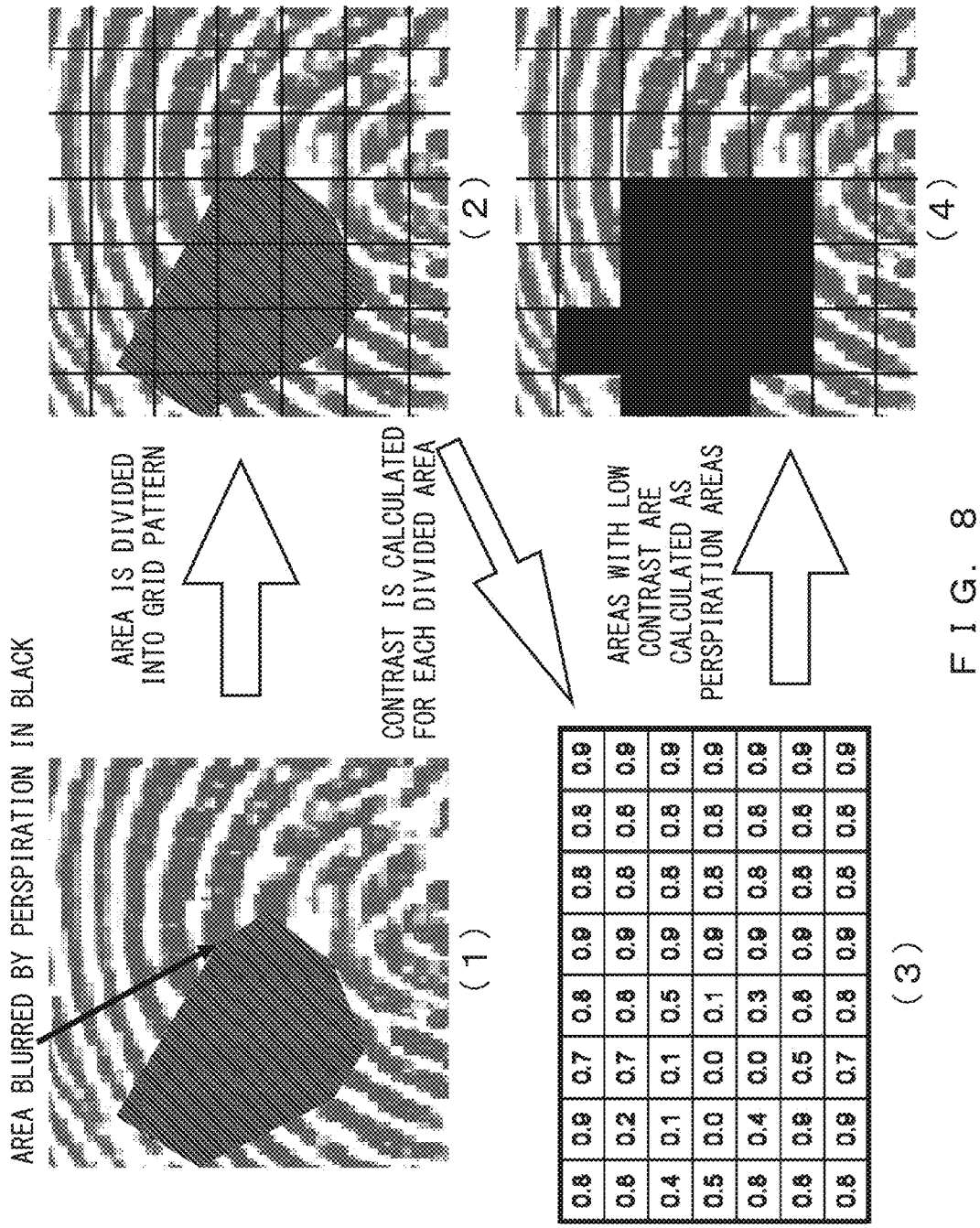
FIG. 8 is a diagram that illustrates the calculation of a perspiration area.

FIG. 8 is a diagram that illustrates a perspiration area. The black portion indicated by the arrow in (1) of FIG. 8 is a perspiration area of a fingerprint image. In order to extract a perspiration area, a fingerprint image is divided into several areas in a grid pattern (see (2) in FIG. 8), and a contrast value is calculated in each area. In FIG. 8, (3) illustrates the contrast values in the divided areas in a grid pattern, and the values are stored in a memory or the like.

Next, areas with low contrast value are extracted as perspiration areas from the contrast values illustrated in (3) of FIG. 8. (4) of FIG. 8 illustrates a result of the calculation in which areas with low contrast values are obtained as perspiration areas.

After perspiration areas are calculated as above, perspiration areas for the next time are estimated in step S54 of FIG. 7.

Figure 9:
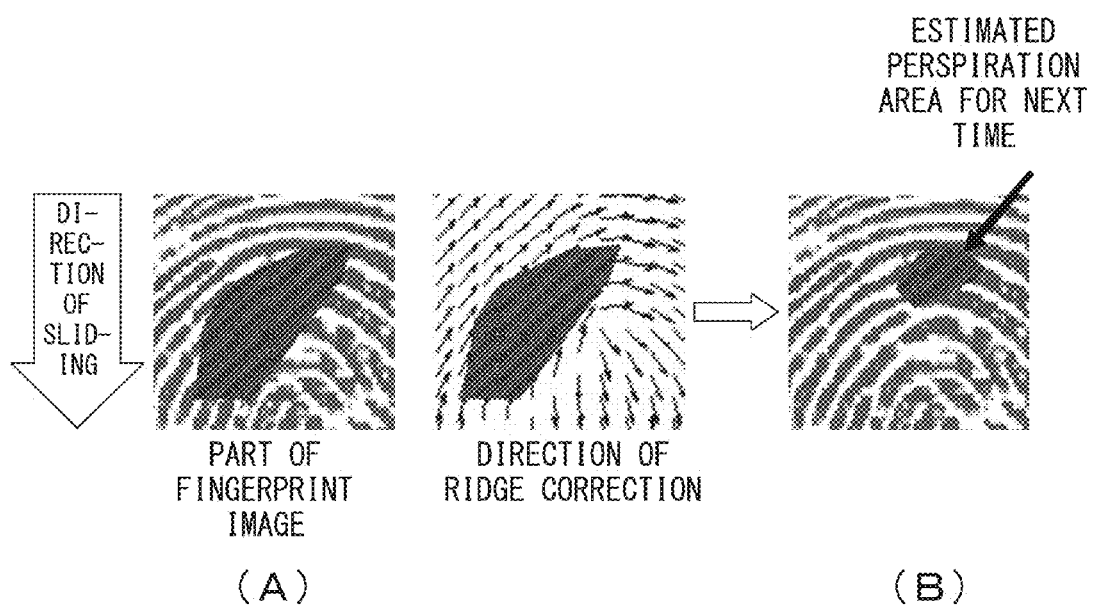
FIG. 9 is a diagram that illustrates perspiration area estimation.

FIG. 9 is a diagram that illustrates perspiration area estimation. (A) of FIG. 9 illustrates a part of a fingerprint image and the direction of the sliding of a finger. In this example, a fingerprint is read by letting a finger slide in a vertically downward direction of FIG. 9. When a finger is slid so as to read a fingerprint, perspiration at a groove is dammed up by a ridge, and the perspiration moves along the direction of the ridge. Because it is not possible to recognize the direction of a ridge at a perspiration area in the input fingerprint image, the direction of a ridge is estimated by performing ridge correction. Then, the direction to which the perspiration moves is estimated according to the estimated ridge direction and the direction of sliding, and a perspiration area for the next time is estimated as illustrated in (B) of FIG. 9.

Here, a method for estimating a next input quality will be described. When a perspiration area exists on a finger and a finger is slid on a fingerprint sensor, the perspiration area also moves due to the force applied to the finger. When the position of a perspiration area for the next time is to be estimated, the ridge direction of a fingerprint is calculated. A fingerprint image is divided into w*w blocks, and the w*w blocks are partially differentiated in a horizontal direction (x-direction) and a vertical direction (y-direction) by using the Sobel filter or the like and an "x" partial differential and a "y" partial differential are thereby calculated. Accordingly, the ridge direction of a fingerprint is obtained. Localized ridge direction θ (i, j) with reference to the center pixel (i, j) of each block is calculated by using the "x" partial differential and the "y" partial differential and the following equation.

$$\theta(i, j) = \frac{1}{2}\tan^{-1}\left(\frac{V_y(i, j)}{V_x(i, j)}\right)$$ [formula 1]

$$V_x(i, j) = \sum_{u=i-\frac{w}{2}}^{i+\frac{w}{2}} \sum_{v=j-\frac{w}{2}}^{j+\frac{w}{2}} 2\partial_x(u, v)\partial_y(u, v),$$

$$V_y(i, j) = \sum_{u=i-\frac{w}{2}}^{i+\frac{w}{2}} \sum_{v=j-\frac{w}{2}}^{j+\frac{w}{2}} \partial_x^2(u, v)\partial_y^2(u, v)$$

In addition to the above calculation method, other known methods such as a method in which a directional filter is used may be applied.

Generally, it is difficult to accurately calculate a ridge direction in a blurred area where the contrast between ridges and valley lines is low. For this reason, a ridge direction correction process is performed to define a ridge direction. As a method for correcting a ridge direction, a method in which a smoothed mask is used, a method in which the flow of a ridge direction is assumed to be a phase diagram used in the field of physics and the flow of a ridge direction is smoothed by performing modeling with the use of a formula, or the like are known.

After the ridge direction is calculated, a perspiration area is calculated. A perspiration area is calculated by dividing a fingerprint image into several areas in a grid pattern and calculating a value of contrast for every area. As a method for calculating a value of contrast, a method in which an average or a dispersion of a pixel value is used, a method in which a low-frequency area is extracted by performing frequency analysis, or the like are known. The calculated value of contrast is compared with a specified threshold, and when the value of contrast is less than a threshold, it is determined that the low-contrast area is a perspiration area.

When a finger is slid so as to read a fingerprint, perspiration is rubbed off and a perspiration area becomes smaller. Perspiration tends to be accumulated in grooves because a fingerprint has a large number of grooves (valley lines). As the direction of the sliding of a finger gets close to the orthogonal direction of the direction of a groove, the effect of damming up the perspiration flow becomes greater. This property is applied, and next perspiration area $R_{next}$ is estimated by using the following equation.

$$R_{next} = \{R(i,j) | \cos(|O'(i,j) - O_{slide}|) > \text{threshold}\}$$ (Equation 2)

R(i, j) indicates the position of a perspiration area obtained from the input biometric information.

O'(i, j) indicates the corrected angle of a ridge direction, and $O_{slide}$ indicates the angle of the direction of the sliding of a finger.

In the equation above, "1" is stored as the value of $R_{next}$ when the relevant area is a perspiration area, and "−1" is stored when the relevant area belongs to other types of areas.

The estimated matching quality calculator 19 calculates estimated matching quality information $Q_{match}$ by using the following equation.

if $R - R_{next} = 0, Q_{match}(i) = 1$ else $Q_{match}(i) = 1/(R - R_{next})$ (Equation 3)

$Q_{match}$ indicates the degree of matching between estimated next quality information $R_{next}$ and quality information R of the actually input fingerprint. $R - R_{next}$ is an integer equal to or greater than "1".

When quality information R of the actually input fingerprint matches the estimated next quality information $R_{next}$ in the equation above, estimated matching quality information $Q_{match}(i)$ is "1".

When quality information R of the actually input fingerprint does not match the estimated next quality information $R_{next}$, the value of the estimated matching quality information $Q_{match}(i)$ becomes smaller than "1". The lower the degree of matching, the lower the value of $Q_{match}(i)$.

The past quality calculator 20 calculates past quality information $Q_{elapse}$ by using the following equation.

$$Q_{elapse} = \Sigma_{k=0}^{N}(Q_{match}(k) - Q_{match}(k-1))$$ [Equation 2]

The authentication appropriateness determination unit 21 compares the past quality information $Q_{elapse}$ and the estimated matching quality information $Q_{match}$ with their thresholds through the use of Equation 1 above, and determines whether or not the biometric information is to be registered.

According to the first embodiment described above, the following advantageous effects are achieved. As it is possible to register biometric information with small variations in quality, it becomes possible to avoid the situation in which biometric information of a low quality or biometric information of an inappropriately high quality in comparison to that at the time of actual operation is registered and the accuracy of authentication at the time of operation drops accordingly. Moreover, as it is possible to register biometric information as long as the biometric information is of a stable quality even if the quality of the biometric information is low, it becomes possible to increase the number of people who may use an authentication system having the biometric information registration device.

In particular, in biometric authentication devices provided for personal computers or the like, it is considered that users may not be familiar with the registration of biometric information and thereby variations in the quality of biometric information at the time of registration may increase. Even in such cases, it becomes possible to prevent the degradation in the accuracy of authentication at the time of actual operation if biometric information with small variations in quality is registered according to the first embodiment described above.

Figure 10:
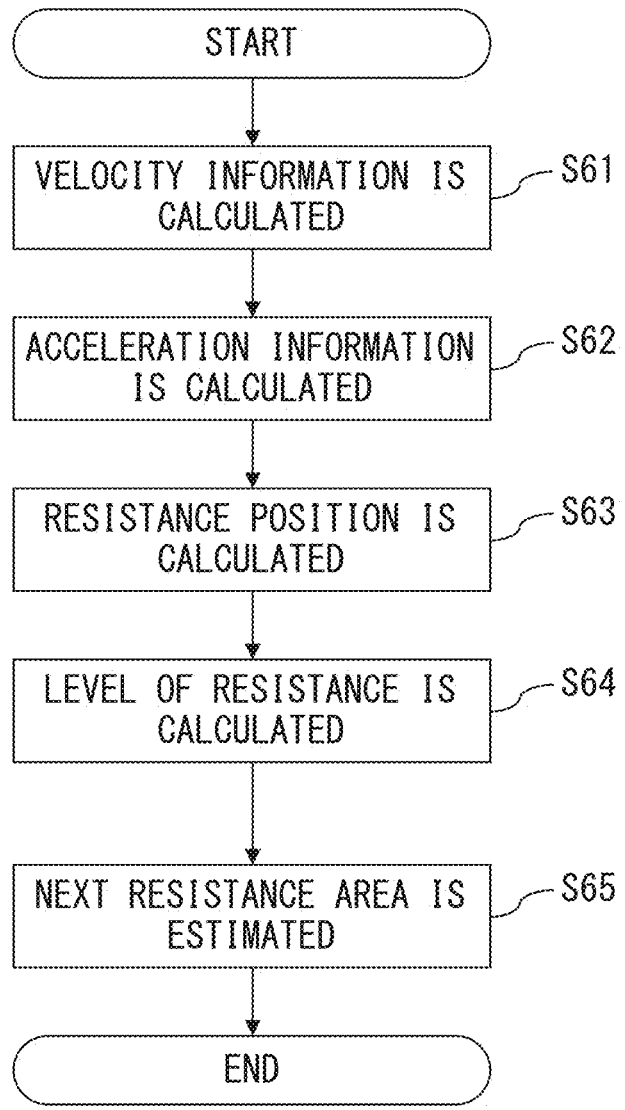
FIG. 10 is a flowchart of the processes in which a resistance area is estimated according to the second embodiment.

Next, FIG. 10 is a flowchart of the processes in which a resistance area of a fingerprint is estimated and guessed to be the quality of a next input according to the second embodiment.

Firstly, the velocity information at the time when a finger is slid on a fingerprint sensor is calculated (S61). Next, acceleration information is calculated from the changes in the velocity information (S62).

Figure 11:
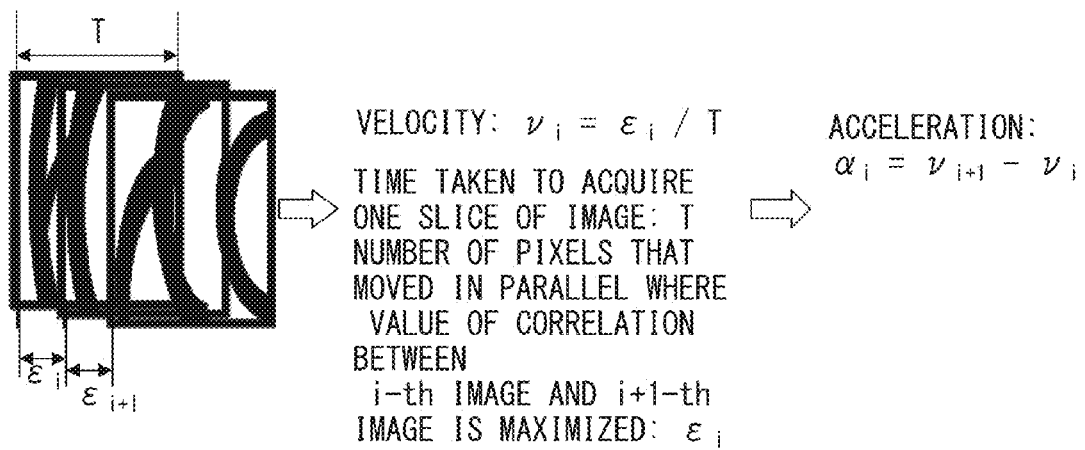
FIG. 11 is a diagram that illustrates the calculation of velocity and acceleration.

FIG. 11 is a diagram that illustrates the calculation of velocity and acceleration. Two partial images (slices of images) of the fingerprint are read by the biometric information reader 12, and the pixel of one of the partial images is moved such that the value of correlation between the two partial images will be maximized. Assuming that the number of pixels that moved in parallel in the above case is $\epsilon_i$, moving velocity $v_i$ of the finger is calculated by $v_i = \epsilon_i / T$.

Acceleration $\alpha_i$ may be calculated by $\alpha_i = v_{i+1} - v_i$ where velocity $v_{i+1}$ and $v_i$ calculated from two successive partial images is used.

Next, an inflection point of the velocity is calculated as a resistance position (S63). In the process of step S43, for example, resistance position $t_i$ is calculated as a position where the value obtained by partially differentiating velocity v with time t becomes 0.

Further, the level of resistance is calculated by using the calculated acceleration information (S64). As the level of resistance becomes greater, the level of acceleration changes to a greater degree when a finger is caught. As the level of resistance becomes smaller, the level of acceleration changes to a smaller degree. Accordingly, the level of resistance may be represented by the amplitude value of acceleration.

Figure 12:
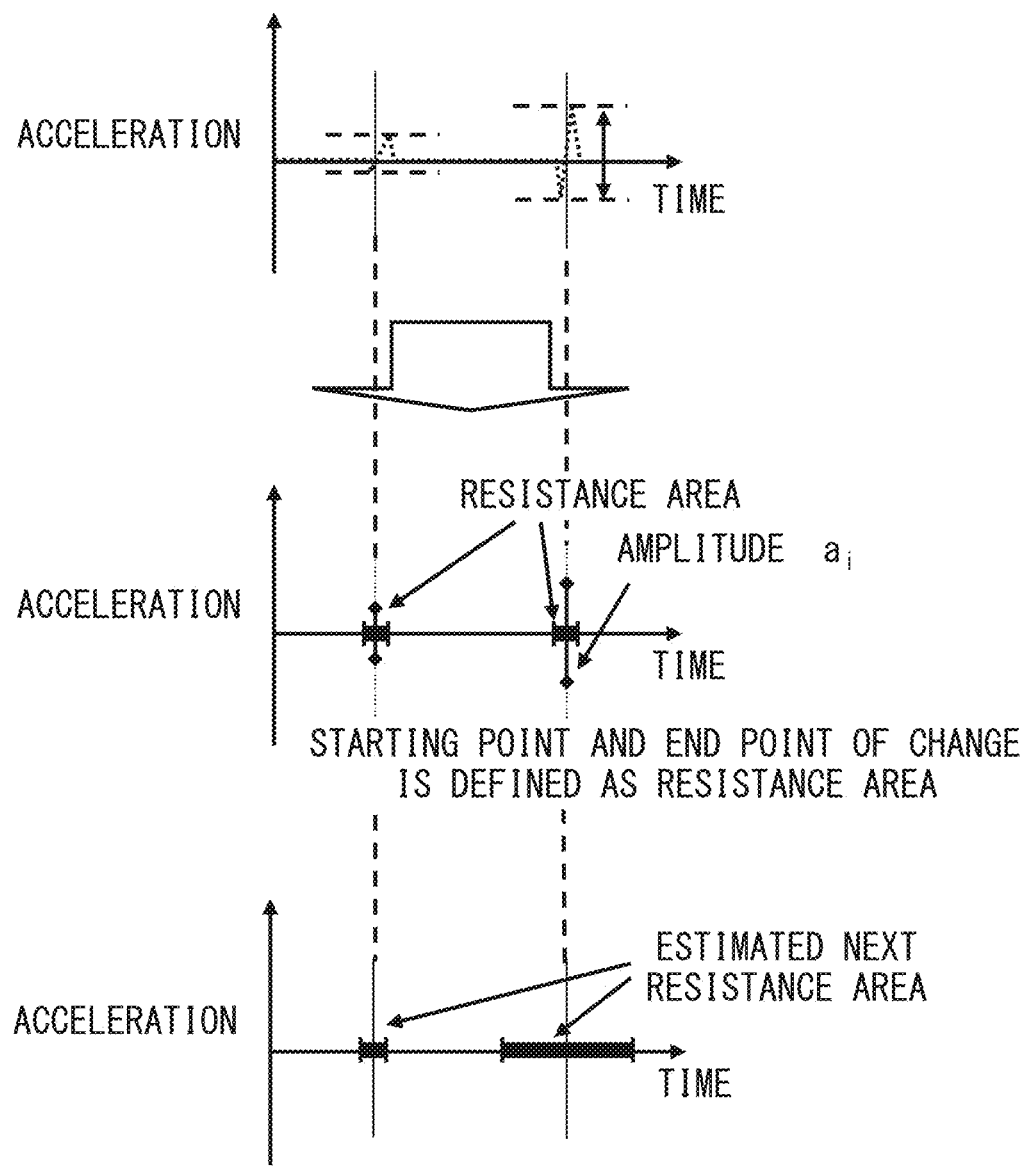
FIG. 12 is a diagram that illustrates a resistance area of a fingerprint.

FIG. 12 is a diagram that illustrates a resistance area where a finger is slid. When a fingerprint is read by letting a finger slide, resistance is caused by friction between the projections and depressions of a fingerprint and a fingerprint sensor, and the moving velocity of the finger changes. In the second embodiment, the position at which the velocity changes when a finger is slid is specified, and the area between a starting point and an end point of a velocity change is defined as a resistance area.

As the level of resistance becomes greater, the level of the deformation becomes greater on the surface of a finger when finger is slid, and a resistance position tends to shift. According to this property, a next resistance position is predicted from the level of resistance and the position of the present resistance area (s65).

Assuming that the present resistance area, the present level of resistance, and an estimated next resistance area are $t_i$, $a_i$, and $t_{next}$, respectively, an estimated next resistance area $t_{next}$ may be expressed in the following equation.

$$t_i - \alpha a_i < t_{next} < t_i + \alpha a_i\ t_{next} = 1$$

$$\text{else } t_{next} = 0 \qquad \text{(Equation 4)}$$

In other words, an estimated next resistance area $t_{next}$ is within the range of from $t_i - \alpha a_i$ to $t_i + \alpha a_i$, and "1" is set as a value for $t_{next}$ when it is within the range, and "0" is set as a value for $t_{next}$ when it is outside the range.

Figure 13:
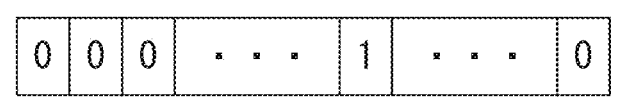

FIG. 13 illustrates the data structure of a resistance area. As described above, "1" is set to the position of the pixel of a resistance area, and "0" is set to the positions of the other pixels.

FIG. 14 is a flowchart of an estimated matching quality calculation process according to the second embodiment.

Firstly, position alignment is performed for a resistance area by performing position alignment between a series of accelerations of when a finger was slid at the previous input and a series of accelerations at the present input (S71). Position alignment for a series of accelerations is performed, for example, by performing end-point free dynamic programming matching. This is a known technique to optimize the association between two pieces of time series data.

Next, weights are assigned to each point of the estimated next resistance areas, and distances D of the corresponding points between the resistance areas of the actually input fingerprint image and the estimated resistance areas are calculated (S72). In the process of step S72, for example, distances D are calculated by $D = \Sigma |t_i - \eta_i * t_{next}|$. $\eta_i$ is a weighting factor for points of a resistance area.

Next, whether or not the calculated distance D is "0" is determined (S73). When the distance D is "0" ("YES" in S73), the process shifts to step S74, and "1" is set as the value for estimated matching quality information $Q_{match}$.

On the other hand, when the distance D is not "0" ("NO" in S73), the process shifts to step S75, and 1/D is set as the value for $Q_{match}$.

How processes are performed in steps S73 to S75 is expressed in the equation below.

$$\text{if } D = 0\ Q_{match}(i) = 1$$

$$\text{else } Q_{match}(i) = 1/D \qquad \text{(Equation 5)}$$

Then, the past quality calculation process in step S18 and the authentication validity determination process in S19 are performed as above, and whether or not the biometric information is to be registered is determined.

According to the second embodiment described above, advantageous effects may be achieved as follows. Because it is possible to register biometric information with small variations in quality, it is possible to avoid the situation in which biometric information of low quality or biometric information of inappropriately high quality in comparison to that at the time of actual operation is registered and the accuracy of authentication at the time of operation drops accordingly.

Moreover, because it is possible to register biometric information as long as the biometric information is of stable quality even if the quality of the biometric information is low, it is possible to increase the opportunity for registration by a user.

Figure 15:
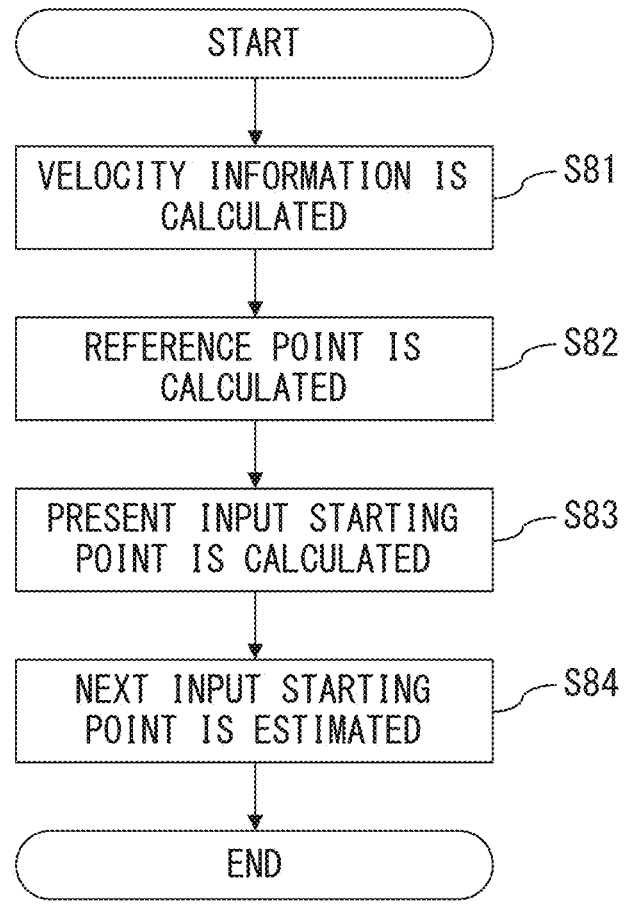
FIG. 15 is a flowchart of the processes according to the third embodiment in which an input starting point is estimated.

FIG. 15 is a flowchart of the processes according to the third embodiment in which the input starting point of a fingerprint is estimated.

The moving velocity of a finger when a fingerprint is input by letting the finger slide is calculated (S81). The process of step S81 in which velocity information is calculated is similar to the process of step S61 of the second embodiment.

Next, a reference point is calculated (S82). In the process of step S82 in which a reference point is calculated, a fingerprint image is divided into a grid pattern and the ridge direction of each block is calculated, and a portion where the amount of change in the ridge direction is large and whose shape is convex towards the tip of a finger (see FIG. 16) is specified as a reference point. Next, the present input starting point is calculated (S83).

Next, a next input starting point $D_{next}$ is estimated according to the calculated input starting point (S84).

It is considered that as moving velocity v of a finger becomes greater, the misalignment of an input starting point also becomes greater. For this reason, the moving velocity v of a finger is taken into consideration, and an estimated input starting point is calculated by the following equation.

$$v * t_{wake} + D_1 - \alpha * v < D_{next} < V * t_{wake} + D_1 + \alpha * V \quad \text{(Equation 6)}$$

v: moving velocity of a finger
$t_{wake}$: starting time of a fingerprint sensor
α: constant
$D_1$: read starting point of a fingerprint sensor
$D_{next}$: estimated next input starting point In other words, an estimated next input starting point $D_{next}$ will be within the range of the present input starting point $D_c \pm \in \alpha * v$. In the third embodiment, for example, the present input starting point $D_C$ may be set as an estimated next input starting point $D_{next}$.

Here, a method for calculating the input starting point of a fingerprint and a method for estimating a next input starting point will be described with reference to FIGS. 16 and 17.

A fingerprint sensor is not always operating, but it starts operating upon detecting a finger placed on the fingerprint sensor. For this reason, it takes a certain length of time until the fingerprint sensor actually starts reading a fingerprint. Assuming that the time taken until a fingerprint sensor starts operating is $t_{wake}$, an input starting point may be calculated from moving velocity v of a finger, time $t_{wake}$, and a read starting point $D_1$. As the distance between a reference point and a read starting point may be calculated from the input fingerprint image, the distance between a reference point to the present input starting point may also be calculated.

Figure 16:
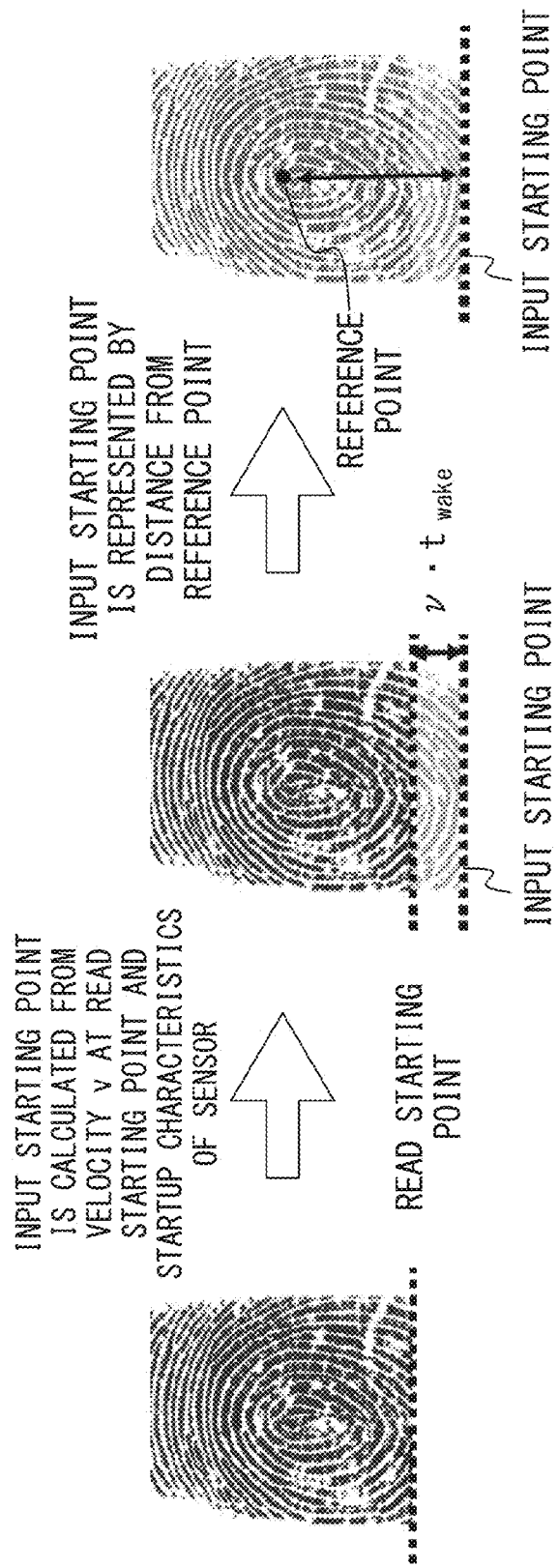
FIG. 16 is a diagram that illustrates how an input starting point is calculated.

It is assumed that the read starting point of a fingerprint image is the position indicated in the fingerprint image on the left side of FIG. 16. Assuming that the moving velocity of a finger and the time taken until a fingerprint sensor starts operating are v and $t_{wake}$, respectively, the input starting point is the position below a read starting point in the vertical direction (as viewed from the front of FIG. 16) by a distance $v * t_{wake}$ (as illustrated in the fingerprint image in the center of FIG. 16).

Assuming that the reference position of a fingerprint is the position indicated by the dark spot on the fingerprint image on the right of FIG. 16, the input starting point is calculated by adding the distance $V * t_{wake}$ to the distance between a reference point and a read starting point.

Figure 17:
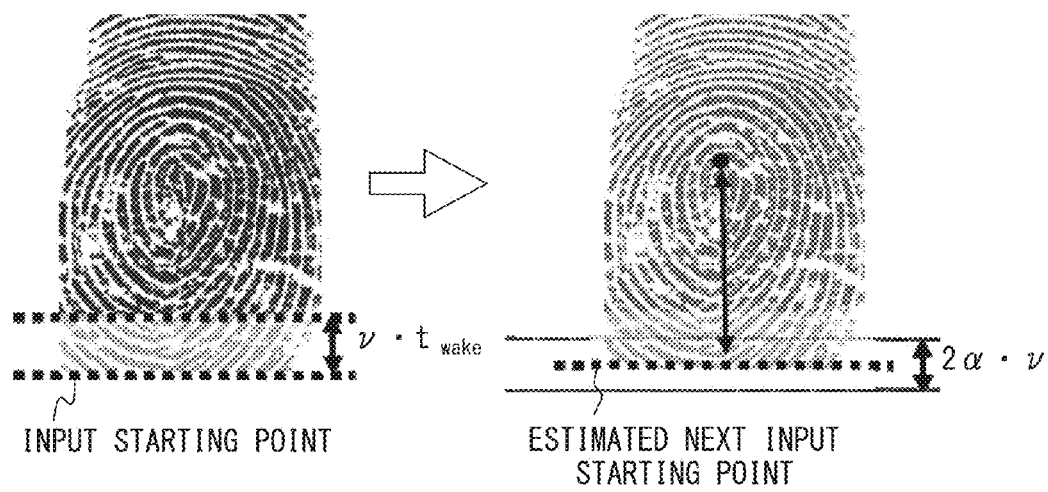
FIG. 17 is a diagram that illustrates how the next input starting point is estimated.

Once the present input starting point is calculated in FIG. 17, the range of $2\alpha * v$ with reference to the input starting point may be specified as an estimated input starting point by referring to the input starting point, the moving velocity v of a finger, and the time $t_{wake}$. For example, the present input starting point may be set for an estimated next input starting point.

In an estimated matching quality calculation process (see S18 in FIG. 4) according to the third embodiment, estimated matching quality information may be calculated from the difference between an estimated next input starting point $D_{next}$ and an actual input starting point $D_i$. The estimated matching quality information may be calculated, for example, by the equation below.

if $D_i - D_{next} = 0$ $Q_{match}(i) = 1$ else $Q_{match}(i) = 1/(D_i - D_{next})$ (Equation 7)

In other words, when the difference between an estimated next input starting point $D_{next}$ and an actual input starting point $D_i$ is 0, "1" is set for estimated matching quality information $Q_{match}(i)$.

When the difference between the actual input starting point $D_i$ and the estimated next input starting point $D_{next}$ is not 0, $1/(D_i - D_{next})$ is set for estimated matching quality information $Q_{match}(i)$.

In the past quality calculation process, the accumulated value of the differences in the estimated matching quality information in chronological order is calculated as past quality information.

According to the third embodiment described above, advantageous effects may be achieved as follows. As it is possible to register biometric information with small variations in quality, it becomes possible to avoid the situation in which biometric information of a low quality or biometric information of an inappropriately high quality in comparison to that at the time of actual operation is registered and the accuracy of authentication at the time of operation drops accordingly. Moreover, because it is possible to register biometric information as long as the biometric information is of a stable quality even if the quality of the biometric information is low, it is possible to increase the opportunities for registration by a user.

In particular, in biometric authentication devices provided for personal computers or the like, it is considered that users may not be familiar with the registration of biometric information and thus variations may occur in the moving velocity of the finger. As a result, variations may also occur in an input starting point. Even in such cases, it is possible to register a fingerprint image with small variations in quality, and it is possible to prevent the degradation in the accuracy of authentication at the time of actual operation.

In the embodiments described above, cases in which a fingerprint image is registered is described. However, the embodiments are not limited to a fingerprint image, and may be applied to a device that registers other types of biometric information such as a palm print.

REFERENCE SIGN LIST 11 metric information registration device
12 biometric information reader
13 operation unit
14 display unit
15 controller
16 feature amount extraction unit
17 quality calculator 18 next input quality estimation unit
19 estimated matching quality calculator
20 past quality calculator
21 authentication appropriateness determination unit
22 biometric information registration unit
23 biometric information database According to the biometric information registration device disclosed herein, it becomes possible to prevent the degradation in the accuracy of authentication at the time of actual operation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A biometric information registration device, comprising:
   an input device; and
   a processor, wherein
   the input device configured to input biometric information,
   the processor configured to calculate quality information of the biometric information which is inputted by the input device,
   the processor configured to estimate quality of biometric information that will be inputted a next time, according to the quality information calculated by the processor,
   the processor configured to calculate estimated matching quality information which indicates a degree of matching between estimated quality information estimated by the processor and quality information of next biometric information calculated by the processor,
   the processor configured to calculate past quality information which indicates how quality of a plurality of pieces of estimated matching quality information varied in the past,
   the processor configured to determine whether or not the biometric information is to be registered according to the estimated matching quality information and the past quality information, and
   the processor configured to register the biometric information when the processor determines that the biometric information is to be registered.

2. The biometric information registration device according to claim 1, wherein
   the processor determines whether or not the biometric information is to be registered according to a result of comparison between the past quality information and a first threshold and a result of comparison between information obtained from the pieces of estimated matching quality information and a second threshold.

3. The biometric information registration device according to claim 1, wherein
   the processor calculates an accumulated value of a difference among the pieces of estimated matching quality information in chronological order as the past quality information.

4. The biometric information registration device according to claim 1, wherein
   the processor determines that the inputted biometric information is to be registered when the past quality information is less than a first threshold and an average value of the pieces of estimated matching quality information is equal to or greater than a second threshold.

5. The biometric information registration device according to claim 1, wherein
   the processor extracts a low-contrast area of a fingerprint image inputted by the input device as a perspiration area,
   the processor specifies a direction of a ridge of the fingerprint image, and estimates a perspiration area of a next input according to a direction of sliding of a finger and the direction of a ridge, and
   the processor calculates estimated matching quality information which indicates a degree of matching between an estimated perspiration area estimated by the processor and a perspiration area of next biometric information calculated by the processor.

6. The biometric information registration device according to claim 1, wherein
   the processor calculates a moving velocity and acceleration of a finger from a plurality of partial images of the fingerprint inputted by the input device, calculates a position at which a velocity changes as a starting point and an end point of a resistance area of when a finger is slid, calculates a degree of acceleration as a level of resistance, and estimates a next resistance area according to the calculated starting point and end point of a resistance area and the calculated level of resistance, and
   the processor calculates estimated matching quality information which indicates a degree of matching between the estimated next resistance area and a resistance area of the next biometric information calculated by the processor.

7. The biometric information registration device according to claim 1, wherein
   the processor calculates a moving velocity of a finger from a plurality of partial images of the fingerprint input by the input device, calculates an inputted starting point of the fingerprint from the calculated moving velocity, a time taken until the input device starts operating, and a read starting point,
   the processor estimates a next input starting point from the inputted starting point and the moving velocity of a finger calculated by the processor, and
   the processor calculates estimated matching quality information which indicates a degree of matching between an estimated next input starting point and an input starting point of next biometric information calculated by the processor.

8. A method for registering biometric information, the method comprising:
   inputting biometric information by using an input device;
   calculating quality information of the inputted biometric information;
   estimating quality of biometric information that will be inputted a next time according to the calculated quality information;
   calculating estimated matching quality information which indicates a degree of matching between estimated quality information estimated by the estimating and quality information of next biometric information;
   calculating past quality information which indicates how quality of a plurality of pieces of estimated matching quality information varied in the past;

determining whether or not the biometric information is to be registered according to the estimated matching quality information and the past quality information; and registering the biometric information according to a result of determination.

9. The method according to claim 8, wherein whether or not the biometric information is to be registered is determined according to a result of comparison between the past quality information and a first threshold and a result of comparison between information obtained from the pieces of estimated matching quality information and a second threshold.

10. The method according to claim 8, wherein an accumulated value of a difference among the pieces of estimated matching quality information in chronological order is calculated as the past quality information.

* * * * *